July 20, 1948.                H. SINGER                 2,445,539
                         CLINICAL THERMOMETER
                         Filed Nov. 4, 1944
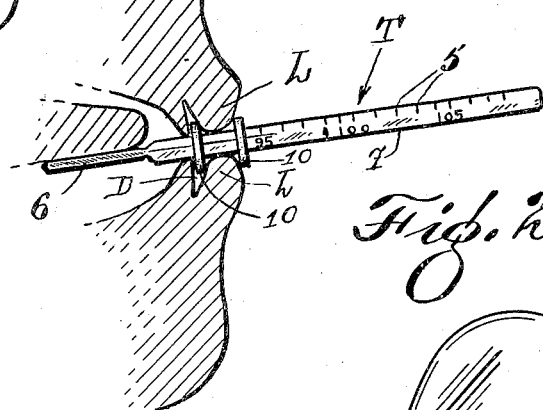
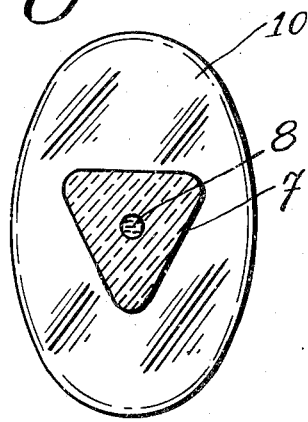
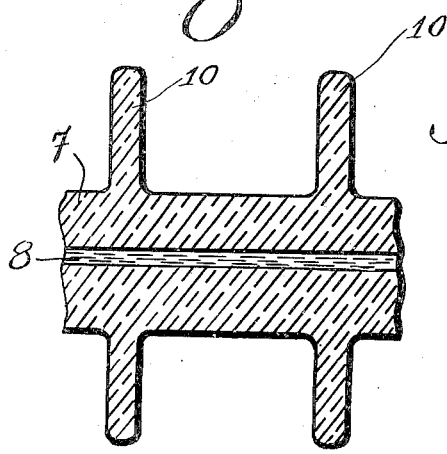
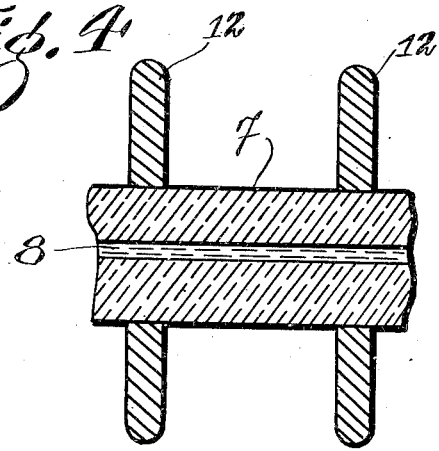
Inventor
Harry Singer
By Robie H. Masters
Attorney Patented July 20, 1948

2,445,539

UNITED STATES PATENT OFFICE 2,445,539

CLINICAL THERMOMETER

Harry Singer, Montreal, Quebec, Canada

Application November 4, 1944, Serial No. 561,880

3 Claims. (Cl. 73—371)

The present invention relates to a thermometer and, more particularly, such a thermometer for clinical purposes.

The usual smooth clinical thermometer is sometimes difficult of adjustment in the mouth of patients, especially children and more or less conscious users. The stem being smooth, there is grave danger of said thermometer being dropped or of slipping into the throat of reclining patients.

The present invention has been conceived to avoid the disadvantages noted above and, accordingly, its main object is the provision of a clinical thermometer of improved character for facilitating the taking of temperature readings.

Another object is the provision of such a thermometer having locating means with respect to fixed points of the user's anatomy.

A further object relates to a thermometer of the character described which is adapted to be produced at a relatively low cost.

Still another object of the invention contemplates the application of locating means adaptable to existing thermometers.

A still further object envisages a thermometer of the character described of simple construction and just as susceptible to asepsis as ordinary instruments.

Other objects and advantages of the invention will become apparent or be further pointed out during the description to follow.

As an example, and for purposes of illustration only, two possible embodiments of the invention are shown in the annexed drawing, wherein:

Figure 1 is a view of the thermometer according to the invention, in place in the mouth of a patient shown fancifully in section, Figure 2 is a transverse section of the thermometer taken midway between the flanges thereon, Figure 3 is a greatly enlarged longitudinal and fractional section of the thermometer showing integral flanges, and Figure 4 is a similar view but showing removably adjustable flanges.

Referring to the drawings wherein similar reference characters represent corresponding parts throughout, the letter T generally indicates a clinical thermometer having the usual graduations 5 and terminated at one end by the elongated mercury bulb 6. The general construction of said thermometer may follow any conventional or adopted practice and, as usual currently, the body thereof 7 may affect the triangular shape adopted generally for magnifying the small internal bore 8 and thus facilitate the reading of the position taken by the mercury therein.

The locating means already mentioned consist of spaced projections or flanges 10 formed on the body of the thermometer adjacent the bulb 6, said flanges being suitably spaced from each other and of a generally non-circular shape so as to preclude the possibility of the thermometer rolling on an inclined plane over the edge thereof. Consequently, said flanges may be in the form shown in Figure 2, that is: an elliptic form or any geometrical shape suitable for the purpose in mind.

The spacing between the flanges 10, as shown in Figure 3, must be calculated so that it corresponds approximately to the thickness of the lips of a patient, said lips being shown at L in Figure 1 and being intended to be received between said flanges. Therefore, the said flanges constitute convenient locating points for the thermometer, in that they afford contact points on the smooth body for receiving the lips of the patient, the innermost flange 10, furthermore, being intended to rest against the teeth D of said patient, also as shown in Figure 1.

Whenever it is desired to provide means for altering the spacing between the flanges, said flanges may be comprised of elements 12 frictionally engaging the smooth body 7 of the thermometer and, accordingly, adjustable thereover. Said flanges 12 may consist of rubber, plastic or any other material having sufficient resiliency to be held frictionally on the smooth body of a clinical thermometer. As in the integral flanges 10, the outer configuration thereof must be non-circular and of a size sufficient that the projection constituted thereby is such as to accommodate comfortably the lips of the patient.

In use, this thermometer performs in a conventional manner and may be sterilized in the same way due to the fact that the flanges, whether of integral glass or removable rubber or the like, can be sterilized in any adopted manner.

From the foregoing, it must be evident that the present invention is an advance of the art in that it permits locating a thermometer in the mouth of a patient in such a way that this position is always constant and, furthermore, by means of spaced members projecting from the stem of the thermometer for the purpose of providing a cavity for the lip-receiving purposes. Inasmuch as the position of the thermometer is always constant in the mouth, the errors that may arise from faulty insertion are thereby eliminated and, again, the said thermometer is more comfortable to the patient in that less effort is required for retaining the thermometer in place without fear of its slipping inside or outside the mouth.

Although the drawing shows the lips as resting between the flanges, it is conceivable that, in certain cases, patients may prefer to have both flanges inside the mouth and behind the lips, as the case may be. In other words, the thermometer may be disposed both ways into the mouth.

It must be understood that various changes as to the size, shape and arrangement of parts may be resorted to without departing from the spirit of the invention or the scope of the subjoined claims.

Having thus described my invention, I claim:

1. As an improvement in clinical thermometers, a pair of non-circular spaced flanges projecting from the stem of said thermometer for locating same in the mouth of a patient.

2. A clinical thermometer having a pair of apertured flanges removably inserted over and frictionally engaging the stem of the thermometer and spaced so as to form a lip-receiving cavity.

3. As a new article of manufacture, a clinical thermometer embodying a pair of intermediate, spaced, projecting flanges on the stem thereof for receiving therebetween the lips, and one of which will rest against the teeth, of a patient.

HARRY SINGER.

REFERENCES CITED

The following references are of record in the file of this patent:

FOREIGN PATENTS

| Number | Country | Date |
|---|---|---|
| 2,525 | Great Britain | Jan. 30, 1897 |
| 12,793 | Great Britain | July 2, 1895 |
| 17,126 | Great Britain | Aug. 6, 1903 |
| 47,289 | Germany | June 8, 1889 |